Patented May 29, 1934

1,960,977

UNITED STATES PATENT OFFICE 1,960,977

PRODUCTION OF HYDROAROMATIC HYDROCARBONS

Mathias Pier, Heidelberg, and Walter Simon, Ludwigshafen - on - the - Rhine, Germany, assignors to I. G. Farbenindustrie Aktiengesellschaft, Frankfort-on-the-Main, Germany, a corporation of Germany No Drawing. Application January 5, 1929, Serial No. 330,629. In Germany January 13, 1928

11 Claims. (Cl. 260—168)

This invention relates to improvements in the manufacture and production of hydroaromatic hydrocarbons and derivatives of the same by hydrogenation of aromatic hydrocarbons or the derivatives thereof, and in particular from crude unrefined aromatic hydrocarbons.

It is already known that crude benzol, for example the crude unrefined fractions containing benzene obtained in gas works, and the like may be freed from sulphur compounds contained therein, as for example thiophene, by treating the said initial material with hydrogen under pressure at elevated temperatures in the presence of catalysts which are not sensitive to sulphur, preferably with an addition of alkali.

We have now found that if benzene and other aromatic hydrocarbons, such as toluene, xylene, naphthalene or anthracene, or derivatives, such as crude phenols, which derivatives are equivalents of the said aromatic hydrocarbons for the purposes of the present invention, be treated in the presence of catalysts under more strenuous conditions, in any case, however, above 350° C., than those employed in the process referred to in the foregoing for purifying crude benzol from sulphur compounds, an extensive hydrogenation of the said aromatic hydrocarbons to hydroaromatic hydrocarbons occurs, besides, if required, the purification from sulphur compounds. Hydrogen or a gas containing or supplying hydrogen may be employed. By more strenuous conditions we mean that, if the catalyst and the pressure employed in our present process be the same as those employed in the aforesaid process of purification, usually temperatures of from about 20 to 30° C. above those necessary for purification only are employed. Again it may be advisable to employ the same temperature and pressure as in the said process of the purification, but to employ a catalyst having a stronger hydrogenating action. A further method of making the conditions more strenuous is to employ the same temperature and catalyst as in the purification process, and to increase the pressure, for example, by about 50 atmospheres. The conditions of working may also be made more strenuous by combining any of the above methods. The temperatures to be employed in individual cases will depend on the kind of aromatic hydrocarbons to be hydrogenated and also on the nature of the catalyst, as for example its composition and method of preparation, and will usually be above 400° C., and preferably between about 450° and 470° to 500° C., but in some cases temperatures of up to about 800° C. may be employed. The operation is carried out under increased pressure, suitably under very high pressure, for example 100 or 200 atmospheres and even more, and usually in the gaseous or vaporous phase, but under some conditions, for example if the pressure be very high, it may also be carried out in the liquid phase. According to the process of our invention a high partial pressure of hydrogen is usually employed. The process according to the present invention possesses the advantage that it is not necessary to employ pure initial materials as was hitherto the case in the hydrogenation of aromatic hydrocarbons with the employment of the usual nickel, iron and platinum catalysts. Moreover, according to this invention, it is not necessary to make special additions for the purpose of desulphurization. Thus, crude benzene, commercial naphthalene and the like may, for example, be employed as initial materials.

As typical examples of catalysts immune against sulphur poisoning suitable for the process of the present invention may be mentioned catalysts comprising compounds containing sulphur in combination, for example metallic sulphides, in particular the heavy metal sulphides and more especially those of the iron group, either alone or as mixtures with one another or with metals, metalloids, active charcoal, coke or the like, or with oxides, hydroxides, or carbonates or with other materials of a catalytic or of inert nature. The sulphur may also be combined with the catalysts by adding sulphites or sulphates thereto or by the addition of sulphur to metals or oxides. A very suitable catalyst may be obtained by treating cobalt with hydrogen sulphide at an elevated temperature. Particularly suitable catalysts of this class are, for example, cobalt sulphide, iron sulphide, zinc sulphide, nickel sulphide, manganese sulphide and the like or mixtures thereof, for example, mixtures of cobalt sulphide with nickel sulphide or of cobalt sulphide with manganese sulphide, or of cobalt sulphide mixed with iron sulphide, or with zinc sulphide or with aluminium sulphide, with or without an addition of inert substances. Catalysts consisting of or containing molybdenum, chromium, tungsten or uranium or the compounds thereof or mixtures of these substances are also particularly suitable. As examples of this type of catalysts may be mentioned molybdic acid or ammonium molybdate, tungsten sulphide, tungstic acid, chromium hydroxide and chromic acid. Mixtures of chromium or tungsten with other catalysts, such as with cobalt, nickel or iron may also be employed.

Activation of the catalysts or the addition of substances increasing their mechanical strength may also be of advantage, this being effected, for example, with substances having a basic action, such as aluminium hydroxide or zinc oxide. Carriers, such as lumps of aluminium silicate may also be employed with advantage. Further may be mentioned catalysts, consisting of porous refractory masses coated with vanadium oxide or thorium oxide or with a mixture of compounds of uranium and zinc or of silver and tungsten. These latter compounds may also be employed as such without application to the said porous materials. As further suitable catalysts may be mentioned catalysts containing active charcoal or the metalloids, silicon, phosphorus, arsenic, selenium, tellurium or the compounds thereof. These metalloids may advantageously be employed together with elements of the 6th group of the periodic system or the compounds thereof. The catalysts may, for example, contain the following acids or their salts, namely phosphoric acid, arsenious acid, silicic acid, boric acid, hydrofluoric acid, hydrochloric acid, selenious acid and the like. As specific examples may be mentioned ammonium molybdenum phosphate, arsenious acid together with molybdenum or tungsten, silicides, for example, iron silicide containing 15 per cent of silicon, active silica, hydrosilicates, molybdenum with 10 per cent of aluminium chloride, molybdenum with 10 per cent of cadmium chloride, molybdic acid with sodium selenite. Compounds containing fixed nitrogen may also be employed with advantage in the reaction. As further examples of suitable catalysts may be mentioned, such containing one or more metals from the (a) 6th group of the periodic system and more particularly molybdenum together with (b) small amounts of other elements from the 2nd to the 7th group of the periodic system or copper or gold or the compounds thereof. The elements from the 2nd and 3rd group may, however, also be employed in large amounts. Thus mixtures containing molecular proportions of molybdic acid with magnesia or with copper or with aluminium hydroxide, or mixtures or tungstic acid with zinc oxide furnish good results. Excellent catalysts are further molybdic acid with about 10 per cent of chromium oxide or of vanadium oxide, molybdic acid with about 10 per cent of uranium oxide or of thorium oxide or of manganous oxide, further tungstic acid containing about 10 per cent of chromium oxide or of a mixture of uranium oxide, cobalt and a small amount of chromium oxide. Again another very suitable class of catalysts is formed by the noble metals or compounds thereof on carriers, in particular on magnesite or chromium oxide. As examples of this class of catalysts may be mentioned ruthenium, palladium, platinum, gold, on magnesia or magnesite, or platinum or gold on chromium oxide. Catalysts containing small amounts of silver or of mixtures of copper with zinc or with cadmium in a free state or in chemical combination and preferably also silicon, or titanium, or vanadium, or chromium, or molybdenum, or cobalt in a free or combined state or mixtures of these are also very suitable. Examples of such catalysts are molybdic acid containing 10 per cent of silver or silica containing 10 per cent of a mixture of copper and zinc.

We prefer to employ catalysts immune against poisoning by sulphur, containing elements from the 5th group of the periodic system or compounds thereof, and in particular such catalysts as consist of or contain metals from the 6th group of the periodic system, or compounds of the same. Molybdic trioxide is a more energetic hydrogenating catalyst than a mixture of molybdic acid and zinc oxide, and therefore the former catalyst will already having a hydrogenating action under conditions, where the latter exerts only a purifying action without any substantial hydrogenation of the aromatic hydrocarbon.

In our process it is not necessary to add alkalies or alkaline earths to the materials under treatment or to the catalysts, and in some cases it may be advantageous to avoid contact of the said materials with alkalies or alkaline earths.

The following examples will further illustrate the nature of the invention, but the invention is not restricted to these examples.

Example 1

Crude benzol is passed, together with hydrogen, over molybdenum trioxide at 460° C. and at a pressure of 200 atmospheres. The benzene is converted quantitatively into cyclohexane. It is preferable not to employ pure molybdenum trioxide, but to mix the same with other substances, such as zinc oxide, manganese oxide and the like or metal powders which substances increase the durability of the catalyst.

Example 2

Toluene is passed together with a stream of nitrogen and hydrogen over cobalt molybdate at 450° C. and 120 atmospheres pressure. After cooling a product containing 80 per cent of methylcyclohexane is obtained.

Example 3

A mixture of equal parts of naphthalene and benzene together with hydrogen is treated with a molybdenum chromium catalyst, obtained from 90 parts of molybdic acid anhydride, 10 parts of chromic acid and 20 parts of kaolin, at 450° C. and 200 atmospheres pressure. The product contains about 50 per cent of cyclohexane, 10 per cent of decahydronaphthalene and 40 per cent of tetrahydronaphthalene.

In the appended claims when the temperature is defined as being sufficiently high to completely hydrogenate the aromatic hydrocarbon undergoing treatment, it is not intended to restrict the application of applicants' process only to hydrogenations in which every carbon atom is completely saturated with hydrogen. While the temperature employed is such that it is possible to completely hydrogenate the initial material, nevertheless, according to our process, it is possible to restrict the duration of treatment at the said temperature so that only partial hydrogenation is effected, as shown in the last example, in which the product consists to a large extent of tetrahydronaphthalene. Such partial hydrogenations are intended to be covered by the appended claims.

What we claim is:

1. A process for the production of hydroaromatic hydrocarbons from aromatic hydrocarbons, which comprises treating an aromatic hydrocarbon with a gas essentially comprising hydrogen, under pressure, in the presence of a catalyst selected from the group consisting of difficultly reducible hydrogenating metal oxides and their corresponding free metals and hydrogenating metal sulphides at a sufficiently high temperature, between 350° C. and 800° C., to completely hydrogenate said aromatic hydrocarbon without any molecular splitting thereof.

2. A process for the production of hydroaromatic hydrocarbons from aromatic hydrocarbons, which comprises treating an aromatic hydrocarbon with a gas essentially comprising hydrogen, under a pressure of at least 100 atmospheres, in the presence of a catalyst selected from the group consisting of difficultly reducible hydrogenating metal oxides and their corresponding free metals and hydrogenating metal sulphides at a sufficiently high temperature, between 350° C. and 800° C., to completely hydrogenate said aromatic hydrocarbon without any molecular splitting thereof.

3. A process for the production of hydroaromatic hydocarbons from aromatic hydrocarbons, which comprises treating an aromatic hydrocarbon with a gas essentially comprising hydrogen, under pressure, in the presence of a catalyst selected from the group consisting of metals of the sixth group, their oxides and sulphides at a sufficiently high temperature, between 350° C. and 800° C., to completely hydrogenate said aromatic hydrocarbon without any molecular splitting thereof.

4. A process for the production of hydroaromatic hydrocarbons from aromatic hydrocarbons, which comprises treating an aromatic hydrocarbon with a gas essentially comprising hydrogen, under a pressure of at least 100 atmospheres, in the presence of a catalyst selected from the group consisting of metals of the sixth group, their oxides and sulphides at a sufficiently high temperature, between 350° C. and 800° C., to completely hydrogenate said aromatic hydrocarbon without any molecular splitting thereof.

5. A process for the production of hydroaromatic hydrocarbons from aromatic hydrocarbons, which comprises treating an aromatic hydrocarbon with a gas essentially comprising hydrogen, under pressure, in the presence of a catalyst selected from the group consisting of difficultly reducible hydrogenating metal oxides and their corresponding free metals and hydrogenating metal sulphides at a sufficiently high temperature, between 400° C. and 500° C., to completely hydrogenate said aromatic hydrocarbon without any molecular splitting thereof.

6. A process for the production of hydroaromatic hydrocarbons from aromatic hydrocarbons, which comprises treating an aromatic hydrocarbon with a gas essentially comprising hydrogen, under a pressure of at least 100 atmospheres, in the presence of a catalyst selected from the group consisting of difficultly reducible hydrogenating metal oxides and their corresponding free metals and hydrogenating metal sulphides at a sufficiently high temperature, between 400° C. and 500° C., to completely hydrogenate said aromatic hydrocarbon without any molecular splitting thereof.

7. A process for the production of hydroaromatic hydrocarbons from aromatic hydrocarbons, which comprises treating an aromatic hydrocarbon with a gas essentially comprising hydrogen, under pressure, in the presence of a catalyst selected from the group consisting of metals of the sixth group, their oxides and sulphides at a sufficiently high temperature, between 400° C. and 500° C., to completely hydrogenate said aromatic hydrocarbon without any molecular splitting thereof.

8. A process for the production of hydroaromatic hydrocarbons from aromatic hydrocarbons, which comprises treating an aromatic hydrocarbon with a gas essentially comprising hydrogen, under a pressure of at least 100 atmospheres, in the presence of a catalyst selected from the group consisting of metals of the sixth group, their oxides and sulphides at a sufficiently high temperature, between 400° C. and 500° C., to completely hydrogenate said aromatic hydrocarbon without any molecular splitting thereof.

9. A process for the production of hydroaromatic hydrocarbons from a material comprising crude benzene, which comprises treating the said initial material at a temperature of about 460° C., with hydrogen under a pressure of about 200 atmospheres, in the presence of a catalyst essentially comprising molybdenum trioxide.

10. A process for the production of cyclohexane from crude benzol which comprises passing said benzol together with hydrogen over a catalyst essentially comprising molybdenum trioxide at about 460° C. and under a pressure of 200 atmospheres.

11. A process for the production of hydroaromatic hydrocarbons from aromatic hydrocarbons which comprises passing a mixture of naphthalene and benzene together with hydrogen at about 450° C. and under a pressure of about 200 atmospheres over a molybdenum chromium catalyst.

MATHIAS PIER.
WALTER SIMON.